(12) United States Patent
Kurtze et al.

(10) Patent No.: US 6,317,515 B1
(45) Date of Patent: Nov. 13, 2001

(54) METHOD AND APPARATUS FOR ENCODING AND DECODING A DATA STREAM USING INFERENTIAL TECHNIQUES

(75) Inventors: Jeffrey D. Kurtze, Nashua, NH (US); Joseph H. Rice, Lexington, MA (US); Robert Gonsalves, Wellesley, MA (US); Chia-Sheng Chou, Cambridge, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/054,941

(22) Filed: Apr. 3, 1998

(51) Int. Cl.$^7$ ........................................................ G06K 9/00
(52) U.S. Cl. ........................ 382/166; 382/246; 358/539
(58) Field of Search ....................... 382/232, 244, 382/246, 420, 239, 245, 247, 421, 162–166; 358/261.1, 262.2, 431, 433, 427, 429, 432, 539

(56) References Cited

U.S. PATENT DOCUMENTS

| | | | |
|---|---|---|---|
| 4,541,008 | 9/1985 | Fishman et al. | 114/293 |
| 4,785,349 | 11/1988 | Keith et al. | 375/240.23 |
| 4,843,468 | 6/1989 | Drewery | 345/25 |
| 5,463,699 | * 10/1995 | Wilkinson | 382/246 |
| 5,708,960 | 1/1998 | Kamisaka et al. | 340/7.48 |
| 5,710,895 | 1/1998 | Gerber et al. | 345/503 |
| 5,784,631 | * 7/1998 | Wise | 395/800 |
| 5,812,791 | * 9/1998 | Wasserman | 395/200.77 |
| 5,966,465 | * 10/1999 | Keith et al. | 382/232 |

FOREIGN PATENT DOCUMENTS

| | | |
|---|---|---|
| 4229394A1 | 3/1994 | (DE) . |
| 0339948A2 | 11/1989 | (EP) . |
| 0390421A1 | 10/1990 | (EP) . |

* cited by examiner

*Primary Examiner*—Joseph Mancuso
*Assistant Examiner*—Ali Bayat
(74) *Attorney, Agent, or Firm*—Peter J. Gordon (57) ABSTRACT

An encoding/decoding method and apparatus encodes an input data stream for compression purposes, and decodes the compressed data stream for use. The encoding process identifies trends in the data stream, and stores information about the trends in an encoded block. The trends may include runs, in which sequential, corresponding gropus in the data stream have constant values. The trends may also include ramps, where sequential, corresponging components in the data stream increase or decrease by a linear value. An encoded block may also be provided to transfer raw data. The encoded blocks do not store type information describing the type of the component associated with the block. Rather, the decoder infers the type of the components associated with the encoded block according to an original order of components in the data stream, the order of the encoded block in the sequence of encoded blocks and a number of the corresponding components encoded by each of the preceding encoded blocks. Once the type of the component is determined, the decoder reconstructs the data stream by translating the encoded trend information into component values. The encoded data stream is thus decoded without any loss in data accuracy. Because type information need not be transferred to the decoder, the size of the encoded block is further reduced, thereby enhancing the compression capabilities of the present invention.

19 Claims, 7 Drawing Sheets

METHOD AND APPARATUS FOR ENCODING AND DECODING A DATA STREAM USING INFERENTIAL TECHNIQUES

FIELD OF THE INVENTION

This invention relates generally to the field of data processing and more specifically to a method and apparatus for encoding and decoding a data stream.

SUMMARY OF THE INVENTION

An input data stream is encoded for storage, and the encoded data stream is decoded for processing. The encoding process identifies trends in the data stream, and stores information about the trends in an encoded block. The trends may include runs, in which sequential, related components in the data stream have constant values. The trends may also include ramps, where sequential, related components in the data stream increase or decrease linearly, with a constant slope. An encoded block may also be provided to transfer raw data. The decoder infers the type of the component associated with the encoded block according to an original order of components in the data stream, the order of the encoded block in the sequence of encoded blocks and a number of the corresponding components encoded by each of the preceding encoded blocks. After the type of the component is determined, the decoder reconstructs the data stream by translating the encoded trend information into component values. The encoded data stream is thus decoded without any loss in data accuracy. Because type information need not be transferred to the decoder, the size of the encoded block is further reduced, thereby enhancing the compression capabilities of the present invention.

One aspect is a method or system for encoding a data stream comprising a sequence of data components. In this aspect, one of the components of data is selected for encoding responsive to an order of the one of the components within the repetitive series, and responsive to a number of each of the components that have been previously encoded, wherein the number of each of the components that have previously been encoded varies according to identified trends in corresponding components of the repetitive series.

In another aspect, a method or system of decoding a series of encoded blocks into a data stream comprising a repetitive series of components of data includes the step of associating an encoded block with one of the components in the repetitive series responsive to the position of the encoded block within the series of encoded blocks, and further responsive to a number of each of the components that have been previously been decoded, wherein the number of each of the components that have previously been decoded may vary according to identified trends in corresponding components of the repetitive series.

According to a further aspect, a method or system of encoding a stream of digitized video data comprising a series of pixels, each of the pixels comprising a plurality of ordered components, includes the step of selecting one of the components in the series of pixels for encoding responsive to an order of the component within the pixel, and responsive to a number of each of the components of each of the pixels that have been previously been encoded, wherein the number of each of the components that have previously been encoded varies according to identified trends in corresponding components of the series of pixels.

In another aspect, a method of decoding a series of encoded blocks into a stream of digitized video data comprising a series of pixels, each of the pixels comprising a plurality of ordered components, includes the step of associating each encoded block with one of the plurality of ordered components responsive to the order of the each encoded block within the series and responsive to a number of the plurality of ordered components that have been decoded, wherein the number of the plurality of ordered components may vary responsive to identified trends in corresponding components of the series of pixels.

In another aspect, a system is provided including a device for storing a sequence of encoded data blocks encoding a repetitive series of a plurality of types of components. The plurality of types of components have a predetermined order. The sequence of encoded data blocks include a first plurality of encoded data blocks ordered responsive to the predetermined order of the series of the plurality of types of components and a second plurality of encoded data blocks, each of the second plurality of encoded data blocks ordered responsive to a number of components encoded in previous encoded blocks encoding components of the same type and responsive to the predetermined order of the series of the plurality of types of components.

DETAILED DESCRIPTION

A technique for encoding and decoding allows a source data stream to be represented by a relatively smaller encoded data stream. The encoded data stream may be decoded to reconstruct the source data stream without any loss of accuracy. This encoding technique may be useful in the art of video processing for transferring video at a rate that allows for real-time special effects processing. In addition, this encoding technique may be useful in any data transfer operation. For example, this technique also has applicability to other areas besides video processing, such as computer design, networking and any system where large amounts of data need to be transferred from a source to a destination with accuracy.

The encoding technique operates by identifying trends in the source data stream and representing the trends using associated encoded blocks. A trend may include a run of one value, where the value is repeated in multiple, sequential related components of the data stream. A trend may also include a ramp of values, where the value of data in one of the blocks increases by a fixed amount in sequential related components. Instead of transferring the discrete blocks that form the trend to a destination, information describing the trend is transferred. For runs, the information includes both a count of the number of sequential related components that have the same value, and that value. For ramps, the information includes a count of the number of sequential related component whose values differ by a fixed amount (i.e, a constant slope), the value of the fixed amount (slope) and the value of the block at the starting point of the ramp. The starting point of the ramp is the value of the first component in the sequential related components forming the ramp. The destination decodes the trend information to reconstruct the data stream with total accuracy.

The above encoding and decoding techniques may be used to encode and decode data streams that include only one type of data. Alternatively, the encoding and decoding techniques may be used to encode and decode data streams that include multiple types of data, where the data stream is formed by repetitive sequences of the multiple data types. The multiple data types may be, for example, components of digitized video. Alternatively, the multiple data types may reflect multiple interlaced data streams from different sources. Accordingly, the type of data is not a limiting factor of the invention.

One example of a data stream that includes repetitive fixed sequences of multiple data types is a digitized video data stream. Digitized video component ordering may follow any standard convention, such as CCIR656 4:2:2, as follows, where time advances left to right, left component first):

Cb0, Y0, A0, Cr0, Y1, A1, Cb2, Y2, A2, Cr2, Y3, A3....

In the above data stream, each pixel is represented by four different types of component data: two types of chrominance data (Cr and Cb), luminance data (Y) and transparency/alpha data (A). As mentioned above, the encoding technique of the present invention is capable of identifying trends in sequential related components, for example sequential Cr bytes in the data stream. Therefore, if a Cr value is constant for ten sequential pixels, when the first of the ten pixels is encoded, the value ten and the Cr value are transferred in one encoded block. No Cr encoded blocks are transmitted for the next nine pixels. Thus, the original order of the received data stream (Cb, Y, A, Cr, Y, A) may not be retained in the encoded data stream.

Because there is no fixed order for the encoded data, the decoder must associate received encoded blocks with their corresponding components. However, in one embodiment, the encoded blocks include no information as to the type of component that the block encodes. In such an embodiment, the decoder infers the type of each of the encoded blocks based on an the order of the fixed sequence of multiple data types in the original data stream and based on the number of previously received components of the different types. Thus, the encoder and decoder follow an ordering convention. This convention may be either a fixed convention or may be altered dynamically during operation. The encoding technique permits the decoder to assume that it is always receiving the exact type of data that is required to maintain the fixed sequence of multiple data types at an output data stream. Removing the need to identify the type of data that is transmitted reduces the amounts of control in the encoded block, and thereby allows for more of the bus bandwidth to be occupied by data transfers, thereby increasing the bus bandwidth between the source and the destination.

Figure 1:
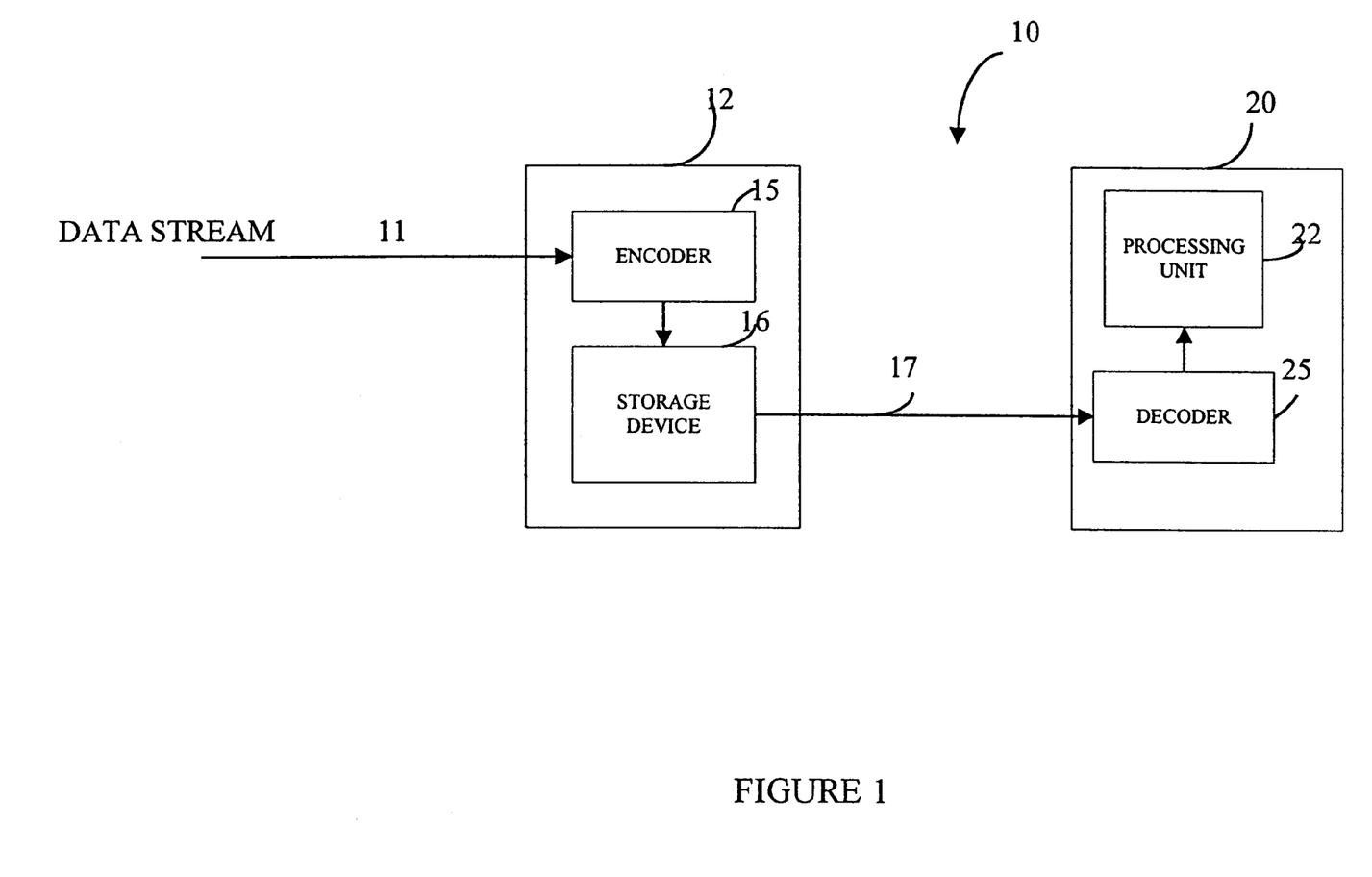
FIG. 1 is a block diagram of source and destination elements in a computer system in one embodiment.

For example, referring now to FIG. 1, example components of a computer system 10 for performing the encoding or decoding process includes a source 12 which receives a data stream on line 11. In one embodiment, the source 12 may be a video and audio I/O subsystem and the data stream may be a series of digitized video components ordered according to CCIR656 4:2:2 format, although the invention is not limited to any particular form of data stream. The source includes an encoder 15 which encodes the input data stream. The encoder 15 may be a computer program executed on a general purpose computer that operates on the data stream either as it is received or after it is stored in uncompressed format in storage device 16, or alternatively may be implemented in hardware. Although the source and destination are shown in the figure as separate machines, they may alternatively be resident on a common device.

Coupled to the source device 12 is a destination device 20. In an example embodiment, the destination device may be a digital film workstation, although the invention is not limited to any particular type of destination device. The destination device includes at least one decoder 25 coupled to at least one processing unit 22. Alternatively, multiple processing units in the destination may share one decoder 25 or have dedicated decoders.

The source transfers encoded data on line 17 to the destination 20. According to one embodiment, communication between the source 12 and destination 20 is data flow controlled. Thus, handshake signals are used to control the flow of data between the source and the destination. One method of controlling the data flow between the source and destination is described in pending patent application entitled "Apparatus and Method for Controlling Transfer of Data Between and Processing of Data by Interconnected Data Processing Elements", Ser. No. 08/879,981, filed Jun. 20, 1997 and incorporated herein by reference. Various implementations for the interconnect and a protocol for controlling data flow over the interconnect are described in: U.S. patent application Ser. No. 08/879,981; U.S. Patent Application entitled "Apparatus and Method for Controlling Transfer of Data Between and Processing of Data by Interconnected Data Processing Elements," filed Apr. 3, 1998, by Craig R. Frink et al.; and U.S. Patent Application entitled "A Packet Protocol for Encoding and Decoding Video Data and Data Flow Signals and Devices for Implementing the Packet Protocol," filed Apr. 3, 1998 by Craig R. Frink, et al.; and U.S. Patent Application entitled "Method and Apparatus for Controlling Data Flow Between Devices Connected by a Memory," filed Apr. 3, 1998 by Craig R. Frink, which are hereby incorporated by reference. In addition, Direct Memory Access (DMA) techniques, known to those of skill in the art, may be used to transfer the data between the source 12 and destination 20. However, the present invention is not limited to any particular data transfer technique.

The encoder 15 encodes the received data stream into a sequence of encoded blocks. The types of encoded blocks include Run code blocks, Ramp code blocks and Raw code blocks, although in one embodiment multiple different variations of the above three types of encoded blocks are provided. Run code blocks are used to encode "runs" of data; i.e., where there is a constant value of data for a given component of the data stream for multiple, sequential iterations of the component. Ramp code blocks are used to encode a series of components when the value of sequential iterations of the component changes at a constant, non-zero rate. Raw code blocks are used to directly encode components when the sequential iterations of the component differ in value and do not have ramp characteristics.

As mentioned above, this encoding method may be used to encode digitized video data, which is comprised of frames each having a predetermined number of lines of pixels in each frame, where each frame may be comprised of a number of fields. In one embodiment, the following control blocks are provided for encoding digitized video, although the present invention is not limited to the types of formats of the encoded blocks described below.

A Run code block is provided for encoding a run of up to 127 values. A Line Run code block is provided for encoding a series of lines all having the same component value. A According to one embodiment, each of the encoded blocks includes two or more bytes of data. The trend represented by the encoded block is indicated by the value of the first (and in some instances the second) byte of the encoded block. Example mappings of byte values to code block definitions are provided in Table I below:

TABLE I

| Description | Byte 0 | Byte 1 | Byte 2 | Byte 3 | Byte 4 |
|---|---|---|---|---|---|
| Run | length (1 to 127) | value | | | |
| Short Raw | length + 128 (129 to 131) | $value_0$ | .... | | |
| Ramp | length + 128 (132 to 254) | value | slope *256 (high-byte) | slope *256 (low-byte) | |
| Long Raw | 255 | length (4 to 255) | $value_0$ | $value_1$ | .... |
| Raw to end | 128 | $value_0$ | $value_1$ | $value_2$ | .... |
| Lock | 0 | 126 | | | |
| Unlock | 0 | 127 | | | |
| Enable Borders | 255 | 3 | | | |
| Disable Borders | 255 | 2 | | | |
| End-of-field | 255 | 1 | | | |
| LineRun | 0 | length + 128 (129 to 255) | value | | |
| LineLen* | 0 | length = 3 (1–125) | 0 | line len (high-byte) | line len (low-byte) |
| ASCII Comment* | 0 | length (1–125) | 1 | $char_0$ | ..... |
| Image Header* | 0 | length (1–125) | 2 | $date_0$ | ..... |
| RFU* | 0 | length (1–125) | subcode (3–255) | $data_0$ | ..... |
| Reserved | 0 | 0,128 | | | |
| Reserved | 255 | 0 | | | |

Short Raw code block is provided for encoding one to three distinct component values. A Long Raw code block is provided for encoding between 4 and 255 components. A Raw to end code block is provided for encoding a series of components, each of which have different values, up until the end of the frame. A Ramp code block is provided for encoding a ramp of between four and 126 values. A Lock code block is provided for causing a constant value of to be used for the component in a given field. An Unlock code block is provided for releasing all locked values.

Other code blocks include an Enable Borders code block for modifying the interpretation of alpha values to allow blending to a border of a frame. A Disable Borders code block resets the interpretation of alpha values to straight blending between a foreground and a background. An End-of-field control block identifies the end of the field within the frame. A Line Length code block identifies the number of bytes of compressed data that represent a complete line.

In addition, an Image Header control block is provided, where the image is a frame or field, and a frame comprises one or more fields. The Image Header control block is the first coding block of a field or frame and provides descriptive information about the field or frame that follows. The first two data bytes in the field constitute a flag word defined, in one embodiment, as follows: bit 7 (high) of $data_0$=1 if a frame follows, 0 if afield follows. The next two data bytes comprise a 16-bit value that is the total size of the compressed data frame/field including the header and all other encoded blocks. This value allows software to quickly skip across fields in a stream of RLE compressed data.

Figure 2:
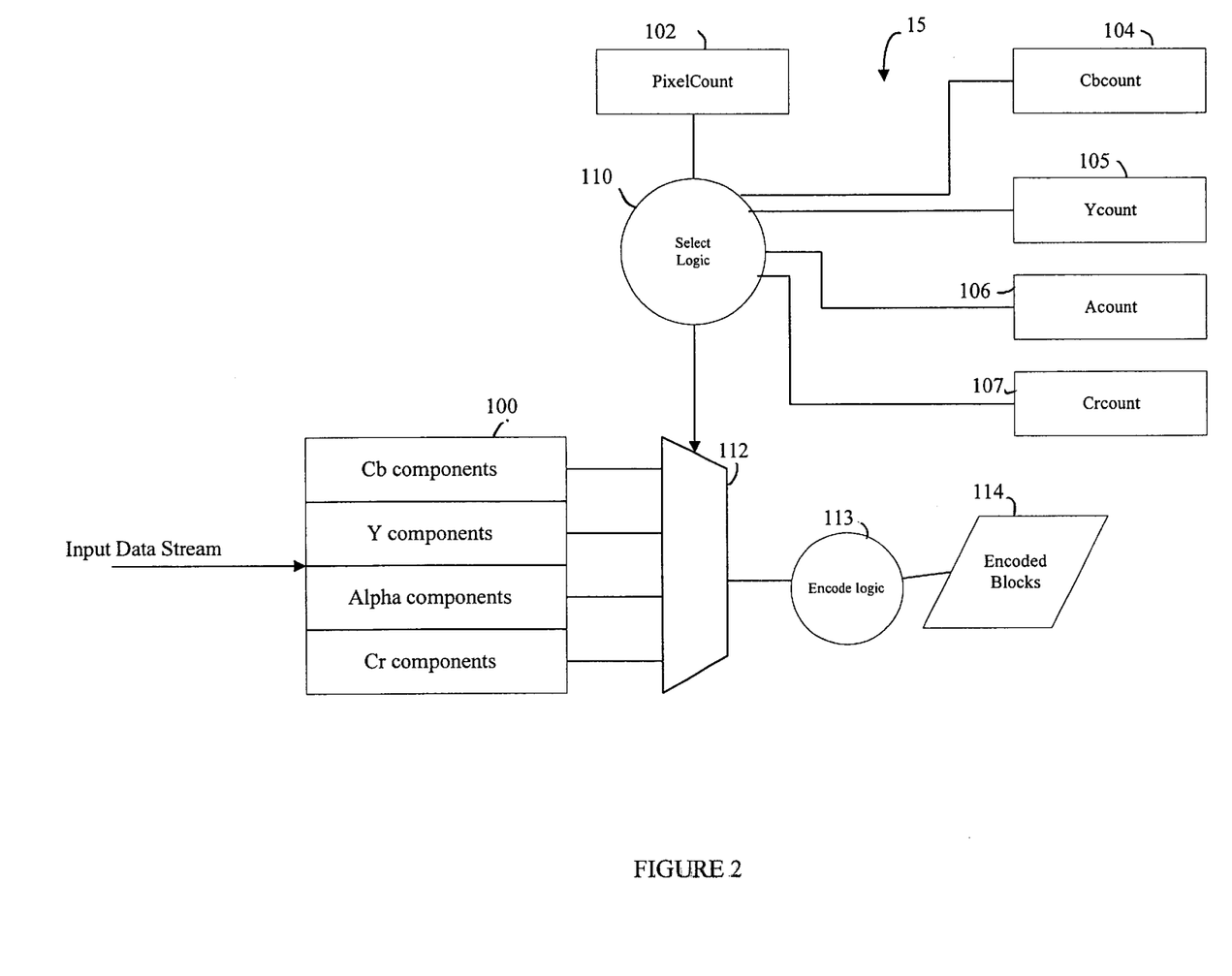
FIG. 2 is a block diagram of one embodiment of an encoder in one embodiment.

One embodiment of an encoder is shown in FIG. 2. The encoder operates as follows. As the stream of digitized video data is received at the video data I/O subsystem 12, it is apportioned into frames of data. Each frame of data is further apportioned into components of Cb, Cr, Y and A components, and stored in storage device 100. The components are then selected for encoding in response to the predetermined ordering convention of the components and the number of components of each type that have already been encoded. The number of components of each type that have been encoded at any given time may vary according to trends that have been recognized and encoded for each of the types.

Thus, one embodiment of the encoder of FIG. 2 includes the following counters: a Pixelcount 102, a Cbcount, 104, a Ycount 105, an Acount 106 and a Crcount 107. Values from the counters are input to select logic 110. Select logic 110 outputs a select line to select one of the types of components 100 to forward to Encoder 113. The results from Encoder 113 are output as Encoded Block 114.

Figure 3A:
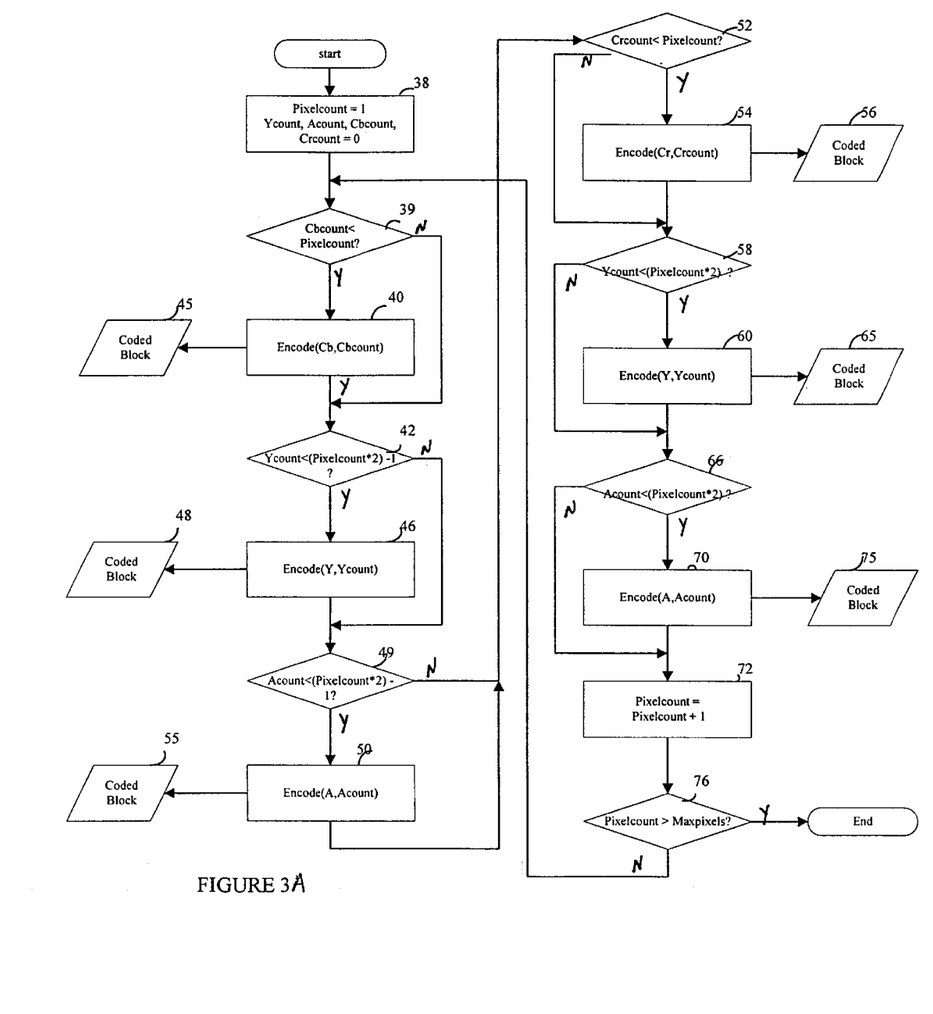
FIG. 3A is a block diagram of one embodiment of an encoder.

Referring now to FIG. 3A, a method for encoding an input data stream of digitized video data received in a Cb, Y0, A0, Cr, Y1, A1 format is shown. The process illustrated in FIG. 3A is only one example of one method of performing encoding according to the table set forth above. Alternative methods may also be implemented within the spirit of the present invention. In any of the potential embodiments, the order of encoding of the Cb, Cr, Y and Alpha components is determined such that the component type selected for encoding generates the type of encoded block required for reconstructing the data stream in its original order.

In one embodiment, in order to ensure that the appropriate encoded block is generated, counters are maintained to monitor the number of Cb, Cr, Y and Alpha values that have already been encoded. The counters are represented by the values Cbcount, Crcount, Ycount and Acount, respectively. The selection of which type of component to encode is thus determined in response to the original order of the fixed data stream and the values of the counters.

The process of FIG. 3A is best explained by way of example. Assume that an input data stream having the following components is received at the source 12:

```
Cb Y A Cr Y A| Cb Y A Cr Y A| Cb Y A Cr Y A| Cb Y A Cr Y A| Cb Y A Cr Y A|...
5  3 1 4  3 0   4  3 1 7  3 0   3  3 1 3  3 0   2  2 1 4  2 1   3  3 1 6  3 0
```

The resulting groupings of components would be:

Cb: 54323

Y: 3333332233

A: 1010101110

Cr: 47346

The encoded blocks and the associated counter values after each cycle of encoding is shown below in Table II:

TABLE II

| cycle | encoded block | Cbcount | Ycount | Acount | CrCount |
|-------|---------------|---------|--------|--------|---------|
| 1 | 132,5,-1 | 4 | | | |
| 2 | 6,3 | 4 | 4 | | |
| 3 | 131,1,0,1 | 4 | 4 | 3 | |
| 4 | 131,4,7,3 | 4 | 6 | 3 | 3 |
| 5 | 131,0,1,0 | 4 | 6 | 6 | 3 |
| 6 | 2,2 | 4 | 8 | 6 | 3 |
| 7 | 3,1 | 4 | 8 | 9 | 3 |
| 8 | 130,4,6 | 4 | 8 | 9 | 5 |
| 9 | 129,3 | 5 | 8 | 9 | 5 |
| 10 | 2,3 | 5 | 10 | 9 | 5 |
| 11 | 129,0 | 5 | 10 | 10 | 5 |

In FIG. 3A, after the digitized video data stream has been received, at step 38 the process of encoding the digitized data stream begins by initializing the Ycount, Acount, Cbcount and Crcount. In one embodiment, a variable Pixelcount is also used to identify which pixel in the data stream is being encoded. At step 38, the Pixelcount variable is initialized to a value of one.

At step 39, the Cbcount is compared against the Pixelcount. If the check at step 39 indicates that a Cb component has not been encoded for the pixel, at step 40 the Cb components are encoded, a code block 45 is generated and the Cbcount is incremented to three. In the above example, the first four Cb components form a ramp of four values, starting at value 5 with a slope of −1. Thus, the encoded block of 132, 5, −1 is generated.

If the comparison at step 39 had indicated that a Cb component had already been encoded for the pixel, or once the Cb component is encoded, the process continues to step 42 where it is determined whether the first Y component of the pixel was encoded. In the above example, the Y components includes a run of six values of three. Thus, the encoded block 6,3 is output as coded block 48 and the Ycount is incremented to six.

If the comparison at step 42 had indicated that the first Y component of the pixel was encoded, or after the Y component is encoded at step 46, at step 49 a compare is made between the Acount and the Pixelcount to determine if the first Alpha value of the pixel has been encoded. In the above example, the first Alpha value has not been encoded, and the resultant encoded block 55 is a Short Raw block including values 1,0,1. The Acount is incremented to three.

At step 52, a comparison is performed between the Pixelcount and the Crcount to determine if a Cr component has been encoded for the pixel. If not, the Cr components are encoded at step 54 and an encoded block 56 is generated. In the above example, a Short Raw block of 4,7,3 is generated, and the Crcount is incremented to three.

The process proceeds to step 58, where it is determined whether the second Y component of the pixel has previously been encoded. If not, encoding is performed at step 60 to generate an encoded block 65. In the above example, six Y components have already been encoded. Thus, no further encoding of Y components is required for this pixel, and the process proceeds to step 66 where the it is determined whether the second Alpha component of the pixel had previously been encoded. In the above example, three Alpha components had previously been encoded, and therefore no further encoding of Alpha values need be performed for this pixel.

At step 72 the Pixelcount is incremented and at step 76 the Pixelcount is compared against the maximum number of pixels in the frame. This value will vary depending upon the type of frame being encoded. If there are still pixels within the frame to be encoded, the process continues at step 38, where the Cbcount is compared against the Pixelcount.

As is evident in the flow diagram of FIG. 3A, encoding is performed on the components when the component is needed to form an entire pixel. Continuing with the above example, when encoding the second pixel (PixelCount=2), the Cbcount (value 4), Ycount (value 6), Acount (value 3), and Crcount (value 3) indicate that no encoding is needed for either the Cb, Cr, Y or first Alpha component of pixel two. However, the second Alpha component for pixel two has not yet been encoded. Thus, at step 68 the Alpha components are encoded to provide a Short Raw encoded block of 129,0.

At step 72, the Pixelcount is incremented to three. Because a sufficient number of components is available to form a third pixel, no encoding is performed for the next pass through the flow diagram, and the Pixelcount is incremented to four. For the fourth pixel, a Cb component need not be encoded because the Cbcount indicates that four components have already been encoded. Thus, the next component that is encoded is the Y component, which results in a Run encoded block of 2,2. The Ycount is incremented to eight. The Alpha components are next encoded, providing a Run encoded block of 3,1, and incrementing the value of the Acount to nine. The Cr components are next encoded, providing a Short Raw of 130, 4,6. The Cb components are next encoded, providing a Short Raw encoded block of 129, 5. The final Y components are next encoded, providing Run encoded block of 2,3 and the final Alpha component is encoded, providing the Short Raw encoded block of 129,0.

Thus, the selection of the type of component to encode is made in response to the predetermined order of the components, the number of the pixel in the stream that is being encoded and the number of each of the components that have previously been encoded. The result is a sequence of encoded blocks, each of the encoded blocks associated with one of the components of the original data stream but including no data representing the association. Rather, the type of the encoded block may be inferred according to the order of the encoded block in the sequence of encoded blocks and a number of components encoded by each of the preceding encoded blocks.

Figure 3B:
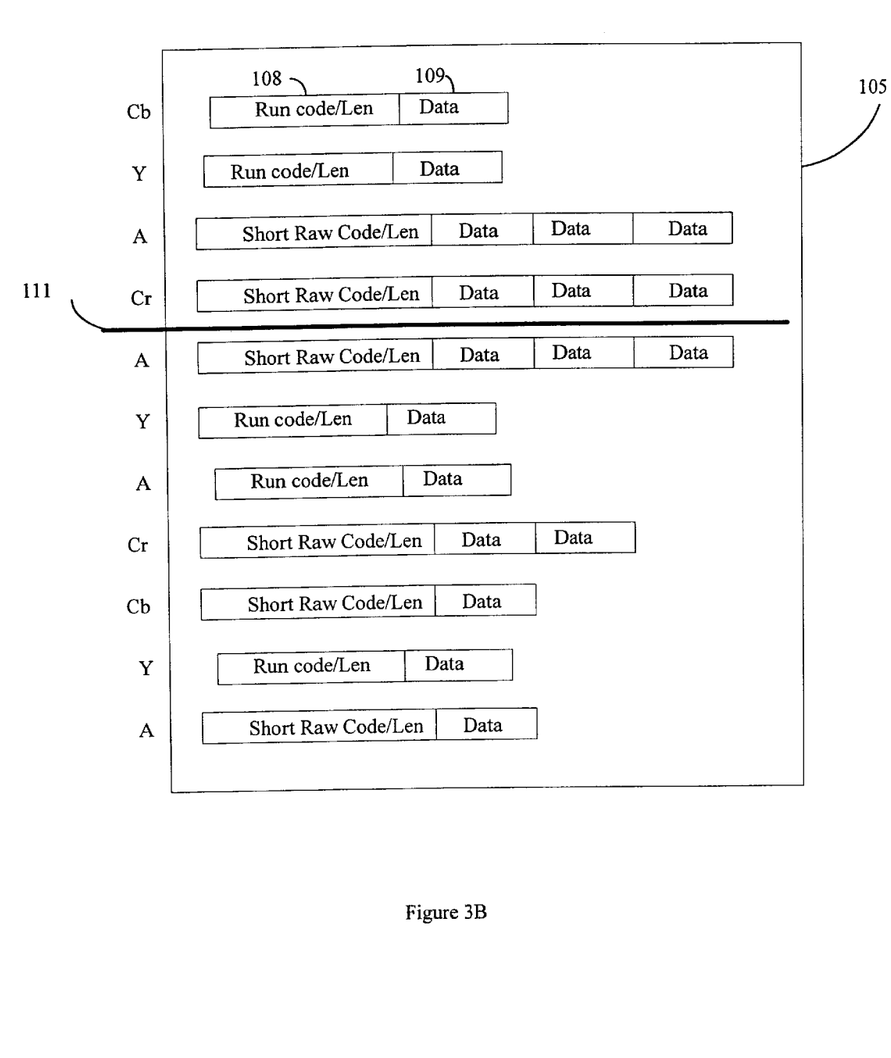
FIG. 3B illustrates an example data format of a series of encoded data blocks.

The sequence of encoded data blocks generated in the above example is shown in FIG. 3B stored in a memory 105. Note that each of the encoded data blocks includes an encoding indicator 108, indicating a type of encoding, and one or more data fields 109. Note that there is no indicator as to the type of component that the block encodes. During the initial encoding phase, indicated by line 111 in FIG. 3B, an encoded block for each one of the types of components is issued according to the predetermined order of the components in the input data stream. After the initial encoding phase, because different numbers of each of the components were encoded in the initial phase, the order of the types of the conventional blocks no longer follows that of the predetermined order of the input data stream. Rather, blocks are selected for encoding as they will be needed to reconstruct the data stream in the original order.

Figure 4:
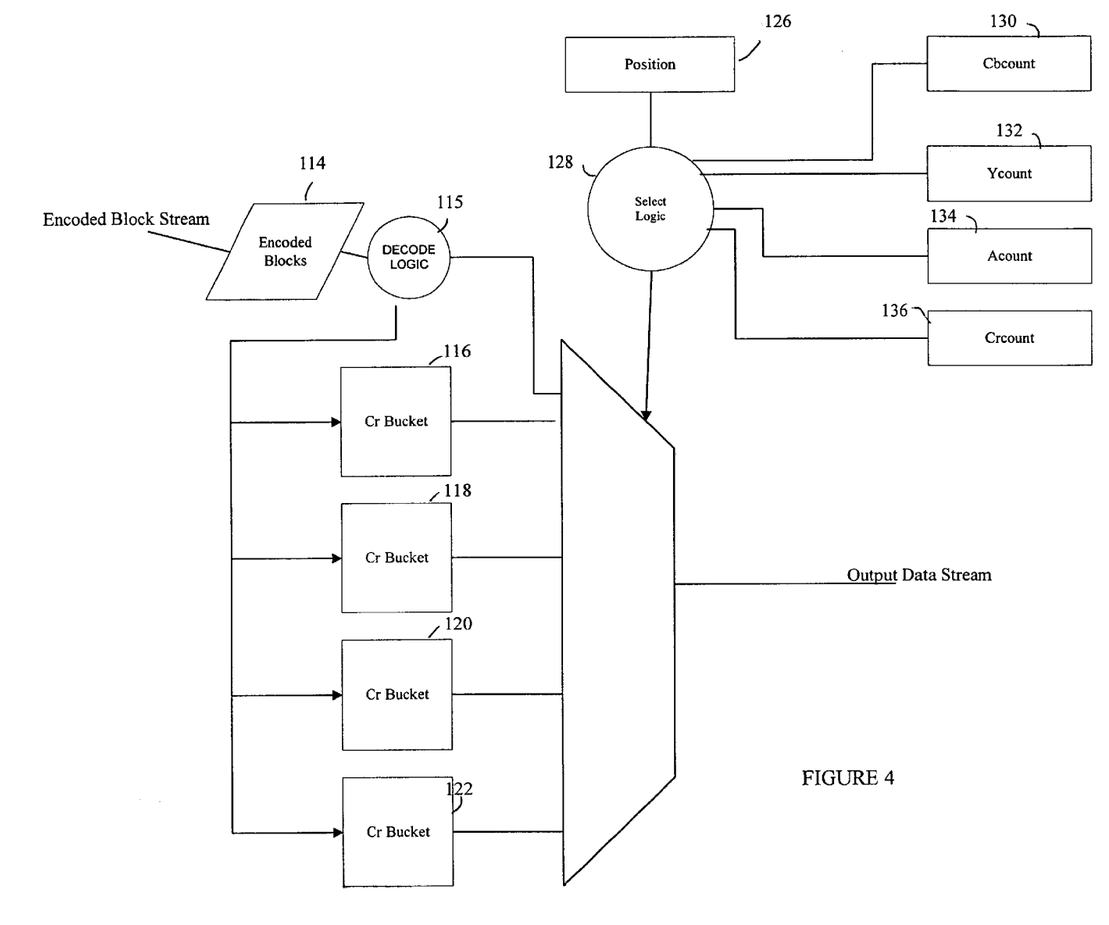
FIG. 4 is a flow diagram illustrating one embodiment of an encoding process.

The encoded data blocks are forwarded to the decoder 25. One embodiment of the decoder 25 is shown in FIG. 4. The decoder 25 provides an output data stream of components having the same order as the original input stream of components received by the encoder 12. As encoded data blocks 114 are forwarded to the decoder, the decoder assumes that an encoded data block received from the encoder 12 encodes the type of component required for the decoder to maintain the order of the output data stream. Therefore, each time that the decoder decodes one of the encoded blocks using decode logic 115, one of the decoded components is output to the output data stream.

Because the encoded blocks may store more than one value for the associated component, each decoded value that is not output in the data stream is stored in a 'bucket' for the associated component. Thus, the decoder 25 includes a Cr bucket 116, a Y bucket 118, an A bucket 120 and a Cr bucket 122. The bucket may be, for example, a storage device such as a First-In-First-Out (FIFO) buffer. Counts are maintained for each of the buckets. Cbcount 130 indicates how many Cb values are available to be output to the output data stream, Ycount 132 indicates how many Y values are available to be output to the output data stream, Acount 134 indicates how many Alpha values are available to be output to the output data stream and Crcount 136 indicates bow many Cr values are available to be output to the output data stream.

Because the component buckets 116–122 store values for the components, the decoder does not always need to decode a block in order to output a component to the output data stream. The sources for the output data stream include the Encoded block 114, the Cr bucket 116, the Y bucket 118, the A bucket 120 and the Cr bucket 122.

The selection of a source for a component in the output data stream is controlled by select logic 128. Select logic 128 receives, as input, the Cbcount 130, Ycount 132, Acount 134 and Crcount 136 as well as a Position value 126. The Position value is used to track the position of the component within the pixel that is being output into the data stream.

When the decoder needs to output a particular type of component in the output data stream, the bucket associated with that particular type of component is first examined to determine if there are any previously decoded values stored for that component. If the counts 130–136 indicate that there are values stored in the bucket, the appropriate value is retrieved from the bucket and output into the output data stream and the count is decremented. Accordingly, the decoder decodes encoded blocks for a component when the count indicates that the bucket for that component is empty.

Figure 5:
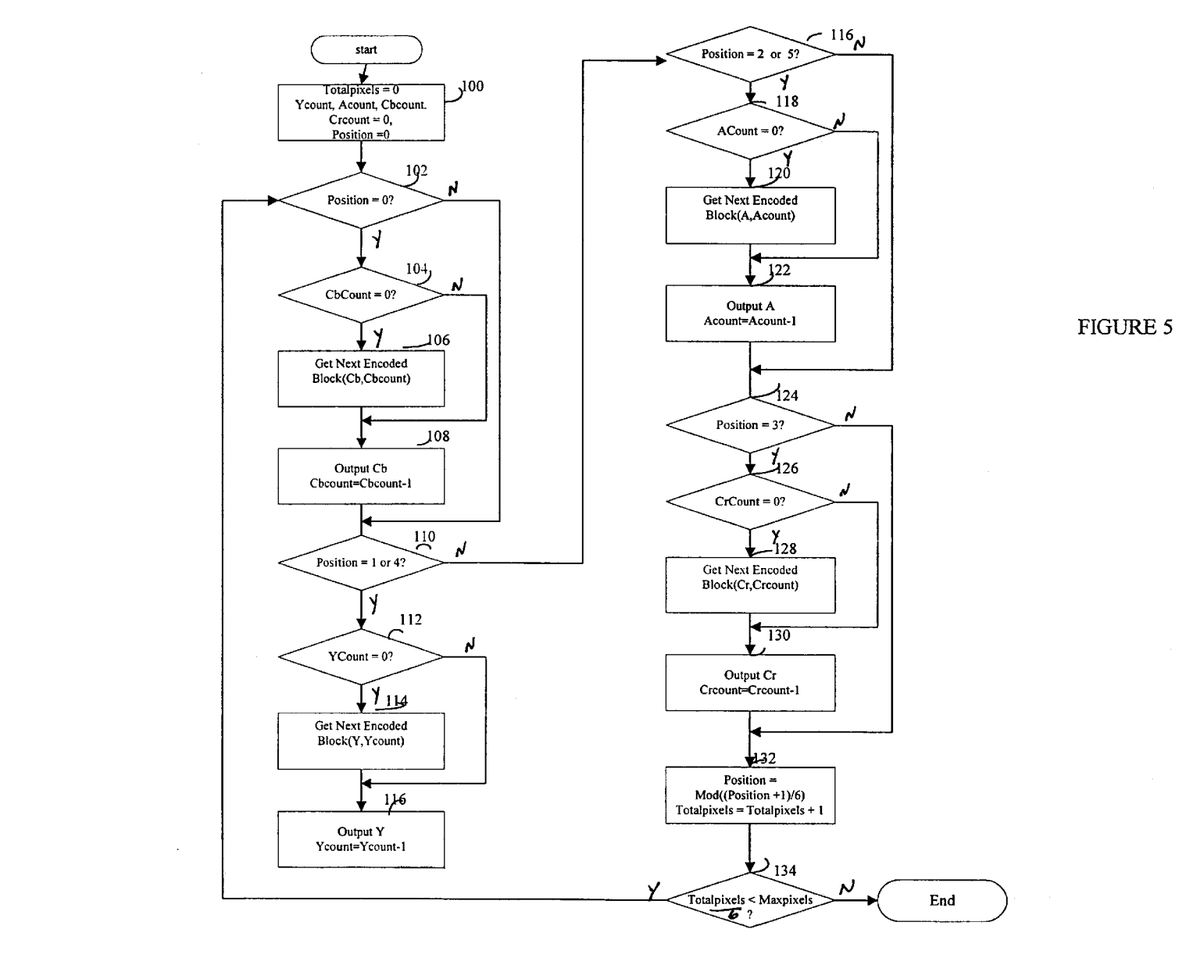
FIG. 5 is a flow diagram illustrating one embodiment of a decoding process.

Referring now to FIG. 5, an example process of such a decoding method for use in decoding digitized video is shown. The variables that are used in the example decoding process of FIG. 5 include Totalpixels, indicating the total pixels processed, Cbcount, Ycount, Crcount and Acount, defined above, and Position, identifying the position, within the pixel of the component being output to the data stream by the decoder.

At step 100 the variables are initialized. At steps 102, 110, 116 and 124, the position of the component within the pixel currently being decoded is evaluated. In this example, component Cb is in byte position zero of a pixel, component Y is in byte position one and four of a pixel, component Alpha is in position two and five of a pixel and component Cr is in byte position three of a pixel. Depending upon the position of the component in the pixel being output, at step 104, 112, 118 or 126 the count associated with the component at that position is compared against zero. If the count is zero, the bucket associated with that component is empty. Accordingly, at step 106, 114, 120 or 128 a process Get Next Encoded Block is executed and the encoded block is retrieved and decoded. The bucket associated with the component at the position being decoded is filled with the decoded values and the associated count is updated. At steps 108, 116, 122 or 130 the component is output to the output data stream and the associated count is decremented. At step 132 the position and Totalpixels variables are incremented. At step 134, the Totalpixels/6(i.e., the number of components in the pixel) is compared against the maximum number of pixels in the fire. If there are more components of pixels to decode, the process returns to step 102 and the process proceeds as described above. Otherwise, the decode process is complete.

Figure 6:
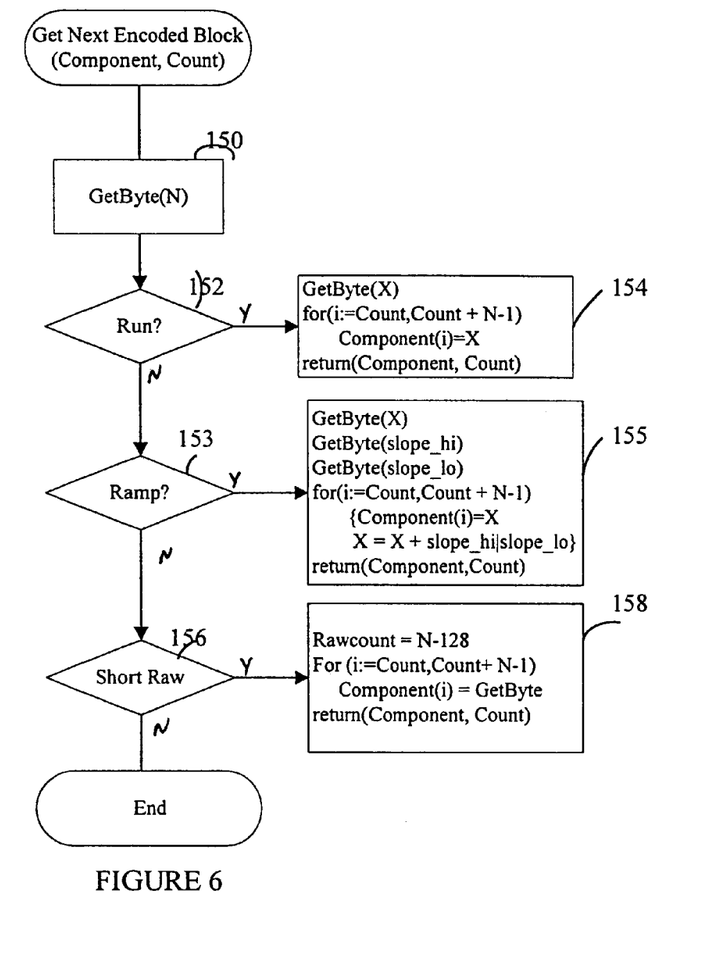
FIG. 6 is a flow diagram illustrating one embodiment of a method for extracting an encoded block for the decoding process of FIG. 4.

FIG. 6 shows a flow diagram of one example of a process for implementing the Get Next Encoded Block processes 106, 114, 120 and 128 of FIG. 5. For ease of explanation, the process of FIG. 6 illustrates routines that may be used to map blocks encoded as Run, Ramp and Short Raw to component values. Modifications that may be made to this process for decoding other types of encoded blocks such as those listed in Table I will be readily apparent to one of skill in the art. At step 150, the first byte of data is extracted from the encoded block as N. As described in the above Table I, in one embodiment, the value of the first byte may be used to indicate the trend represented by the encoded block. At step 152, it is determined whether this value maps to a Run trend. If it does, then the extracted byte value is also indicative of the number of components in the run. Thus, the code sequence extracts the next byte value, and maps this value to the next N bucket locations of the component.

If at step 152 the encoded block was not a Run code block, then at step 153 it is determined whether the value N indicates that the encoded block represents a trend is a Ramp. If so, at step 155 the next three bytes (indicating the starting value and two bytes of the slope of the ramp) are extracted from the encoded block. The procedure at step 155 is then invoked to build the ramp from the extracted components.

If at step 152 it is determined that the encoded block is not a Ramp code block, at step 156 it is determined whether it is a Short Raw code block. If so, at step 158, the number of raw values is determined, and a byte is extracted from the encoded block for each raw value.

Applying the processes of FIGS. 5 and 6 to decode the set of encoded blocks in Table II will now be described with reference to the steps of FIG. 5. When decoding begins, at step 102, Position equals zero, at step 104 Cbcount equals zero and therefore at step 106 the first encoded block is inferred to be a Cb type block. The Ramp is decoded and the Crcount is set to four. At step 108 the Cb value of '5' is output and Cbcount is decremented to three.

At step 132, the position is incremented one. At steps 110 and 112, when position is equal to one, and Ycount is equal to zero, respectively, the next encoded block is inferred to be a Y type encoded block. The block is decoded as a Run code block having six values of three. At step 114, the Y component value of '3' is output and Ycount is decremented to five.

At step 132, the position is incremented to two. Thus, at steps 116–118, the Alpha bucket is determined to be empty, and therefore the next encoded block is decoded as an Alpha type, Short Raw block having three values of 1,0,1. At step 122, the Alpha type component value of '1' is output and the Acount is decremented to two.

At step 132, the position is incremented to three. Thus, at steps 124–128, the Cr bucket is determined to be empty, and the next encoded block is decoded as a Cr type, Short Raw block having three values of 4,7,3. At step 130, the Cr type component value of '4' is output and the Crcount is decremented to two.

At step 132, the position is incremented to four. The process proceeds to step 110, where it is determined that there is a Y component in the Y component bucket. At step 116, the Y component value of '3' is output, and the Ycount is decremented to four. At step 132, the position is again incremented to five. The process proceeds to step 116, where it is determined that there is a value in the Alpha component bucket. At step 122, the Alpha component is output from the bucket and Acount is decremented to one.

The position value continues to increment, and components continue to be output from their buckets until the Alpha component bucket runs dry in the second pixel. Thus, the next encoded block is retrieved and inferred to be an Alpha type component, Short Raw of 0,1,0. The '0' Alpha component is output to the output data stream and the process continues until all of the encoded blocks are decoded. The resulting, decoded data stream exactly matches the original data stream.

In this method for compressing and decompressing a data stream using run length encoding techniques the compressed data may be reconstructed without any loss to data accuracy. The compression abilities of the method are further enhanced because no control data identifying the type encoded blocks are required. Rather, the encoder selects a component for encoding in response to a predetermined order of components in the original data stream and in response to the number of each of the components that have previously been encoded. The decoder infers the type of an encoded block based on the order of the encoded block and a series of encoded blocks, and based on the number of each of the components that have previously been decoded.

Although the above description has proceeded with regard to digitized video data, the described method is not limited to the transfer of any particular type of data. Rather, the techniques described above may be readily adapted by those of skill in the art to any data transfer, storage or processing application.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A method of encoding a data stream comprising a repetitive-series of a plurality of types of components, the method comprising the step of:
   tracking, for each of the plurality of types of components, a number of components that has been encoded;
   selecting one of the plurality of types of components according to an ordering of the plurality of types of components within the repetitive-series, and according to the number of components of each of the plurality of types of components that have been encoded; and
   encoding a number of components of the selected one of the plurality of types of components, the number depending on identified trends among the components, of the selected one of the plurality of types of components, that have not been encoded.

2. The method according to claim 1, further comprising the step of:
   identifying a trend among components of the selected one of the types of components of the repetitive-series.

3. The method according to claim 2, wherein the step of identifying the trend further comprises the step of identifying sequential corresponding components having the same value.

4. The method according to claim 2, wherein the step of identifying the trend further comprises the step of identifying sequential corresponding components where the values of the sequential corresponding components are linearly changing.

5. The method according to claim 1, wherein the repetitive-series of a plurality of types of components comprise components of digitized video.

6. A method of decoding a series of encoded blocks into a data stream comprising a repetitive-series of a plurality of types of components, the method comprising the steps of:
   tracking for each of the plurality of types of components, a number of components that has been decoded;
   associating an encoded block with one of the plurality of types of components in the repetitive-series according to the position of the encoded block within the series of encoded blocks, and further according to a number of each of the components of each of the plurality of types that have been decoded; and
   decoding the encoded block into a number of components of the associated one of the plurality of types of components, the number depending on identified trends among the components of the associated one of the plurality of types of components.

7. The method according to claim 6, wherein the step of associating further operates responsive to an order of components of data within the repetitive-series.

8. The method of claim 5 wherein the repetitive-series of a plurality of types of components represents a series of pixels.

9. The method of claim 6 wherein the repetitive-series of a plurality of types of components represents a series of pixels.

10. The method according to claim 9, wherein the step of associating further operates responsive to a predetermined order of components of data within the repetitive-series.

11. The method according to claim 9, wherein the identified trends include a run trend where sequential corresponding components have a common value.

12. The method according to claim 9, wherein the identified trends include a ramp trend where for sequential corresponding components the values of the sequential corresponding components are linearly changing.

13. An apparatus for encoding an input data stream comprised of a repetitive-sequence of a plurality of types of components, the apparatus comprising:

a counter for each one of the plurality of types of components, each counter for tracking a number of components of the one of the plurality of types of components that are encoded by the apparatus;

a selector, responsive to values of each of the counters and to an ordering convention of the plurality of types of components within the repetitive-sequence of the plurality of types of components, for selecting one of the plurality of types of components from the input data stream; and an encoder for encoding a number of components of the selected one of the plurality of types of components, the number depending on identified trends among the components, of the selected one of the plurality of types of components, that have not been encoded.

14. A decoder for decoding a sequence of encoded blocks into an output data stream comprising a repetitive-sequence of a plurality of types of components, the decoder comprising:

a counter for each one of the plurality of types of components, each counter for tracking a number of components of the one of the plurality of types of components that have been decoded but not output to the output data stream;

a storage device for each one of the plurality of types of components, each storing device for storing components of the one of the plurality of types of components that have been decoded but not output to the output data stream;

decode logic for decoding each encoded block in the sequence into a component of one of the plurality of types of components; and select logic for selecting one of the plurality of decoded components to output to the output data stream in response to a value of each one of the counters and filter responsive to a predetermined ordering convention of the output data stream.

15. A system including a device for storing a sequence of encoded data blocks encoding a repetitive-series of a plurality of types of components, the plurality of types of components having a predetermined order within the repetitive-series of a plurality of types of components, the sequence of encoded data blocks comprising:

a first plurality of encoded data blocks ordered responsive to the predetermined order of the series of the plurality of types of components; and a second plurality of encoded data blocks, each of the second plurality of encoded data blocks ordered according to a number of components encoded in previous encoded blocks encoding components of the same type and according to the predetermined order of the plurality of types of components within the repetitive-series of the plurality of types of components.

16. The system according to claim 15, further comprising:

a decoder for decoding the sequence of encoded blocks into an output data stream comprising the repetitive-series of the plurality of types of components, the decoder comprising:

a counter for each one of the plurality of types of components, each counter for tracking a number of components of the one of the plurality of types of components that have been decoded but not output to the output data stream;

a storage device for each one of the plurality of types of components, each storing device for storing components of the one of the plurality of types of components that have been decoded but not output to the output data stream;

decode logic for decoding each encoded block in the sequence into a component of one of the plurality of types of components; and select logic for selecting one of the plurality of decoded components to output to the output data stream in response to a value of each one of the counters and further responsive to a predetermined ordering convention of the output data stream.

17. An apparatus for encoding an input data stream comprised of a repetitive-sequence of a plurality of types of components, the apparatus comprising:

means for tracking a number of components of each of the plurality of types of components that are encoded by the apparatus;

means, responsive to values of each of the counters and to an ordering convention of the plurality of types of components within the repetitive-sequence of the plurality of types of components, for selecting one of the plurality of types of components from the input data stream for encoding; and means for encoding a number of components of the selected one of the plurality of types of components, the number depending on identified trends among the components, of the selected one of the plurality of types of components, that have not been encoded.

18. A decoder for decoding a sequence of encoded blocks into an output data stream comprising a repetitive-sequence of a plurality of types of components, the decoder comprising:

means for tracking a number of components of each of the plurality of types of components that have been decoded but not output to the output data stream;

means for storing components of each of the plurality of types of components that have been decoded but not output to the output data stream;

means for decoding each encoded block in the sequence into a component of one of the plurality of types of components; and means for selecting one of the plurality of decoded components to output to the output data stream in response to the means for tracking and further responsive to a predetermined ordering convention of the output data stream.

19. A storage device comprising:

a computer readable medium;

information indicative of a sequence of encoded blocks stored on the computer readable medium, each of the encoded blocks consisting essentially of:

an encoding indicator, indicating a type of encoding performed on the block; and at least one data field, wherein the encoded blocks in the sequence represent different types of components and wherein the type of component is not encoded in the block.

* * * * *